Figure 1:
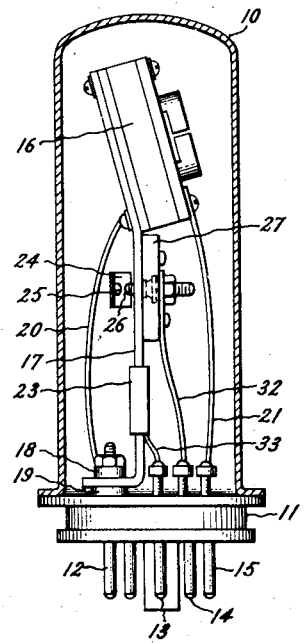

Nov. 3, 1942.  C. F. BALDWIN  2,301,008

TEMPERATURE CONDITIONING APPARATUS

Filed Jan. 1, 1942

Inventor:
Charles F. Baldwin,
by Harry E. Dunham
His Attorney.

Patented Nov. 3, 1942

2,301,008

UNITED STATES PATENT OFFICE 2,301,008

TEMPERATURE CONDITIONING APPARATUS

Charles F. Baldwin, Schenectady, N. Y., assignor to General Electric Company, a corporation of New York Application January 1, 1942, Serial No. 425,320

8 Claims. (Cl. 219—19)

This invention relates to temperature conditioning apparatus, and more particularly to apparatus for maintaining a device at a constant temperature.

This application in a continuation in part of my former application, Serial No. 341,976, filed June 22, 1940, and assigned to the same assignee as the present application.

Certain devices, whose operating characteristics change upon change in temperature, are desirably maintained at a constant temperature for better operation. It is an object of my invention to provide new and improved means to maintain the temperature of a device within very narrow limits even when ambient temperature changes over wide limits.

It is a more particular object of my invention to provide new and improved apparatus to maintain the temperature of a device substantially constant while the ambient temperature varies over a predetermined range.

It is an additional object of my invention to provide such apparatus which is capable of maintaining constant the temperature of the device, or of making its temperature rise by any desired predetermined amount, while ambient temperatures fall through a predetermined range of temperature.

My present invention is especially suited to maintain electric circuit elements, such as piezoelectric vibrators, at highly constant temperatures under adverse conditions and over long periods of time. It is well known that the operating frequency of a piezoelectric device generally changes by a predetermined amount upon a predetermined change in its operating temperature. Such piezoelectric vibrators are frequently used in conjunction with other electric circuit elements whose operating frequency tends to change in temperature, and whose large physical size or other characteristic, makes it undesirable to provide special means for maintaining such circuit elements at a constant temperature.

It is accordingly still another object of my invention to provide new and improved means for controlling the temperature variations of such a piezoelectric device so that its operating frequency varies in such fashion upon changes in ambient temperatures as to tend toward compensation for simultaneous changes in operating frequency of associated circuit elements.

It is a further specific object of my invention to provide new and improved means for controlling the operating temperature of such a piezoelectric device so that its operating temperature, as desired, either remains substantially constant, or increases at a desired rate, as ambient temperatures decrease through a predetermined range.

Figure 2:
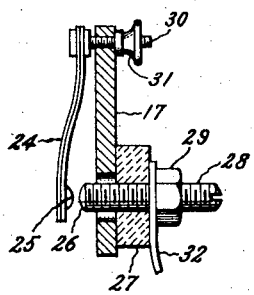

The features of my invention which I believe to be novel are set forth with particularity in the appended claims. My invention itself, however, both as to its organization and method of operation, together with further objects and advantages thereof may best be understood by reference to the following description taken in connection with the accompanying drawing in which Fig. 1 is a view, partly in section, of apparatus embodying my invention; Fig. 2 is a detailed sectional view of a portion of Fig. 1, and Figs. 3, 4 and 5 are schematic representations of a device such as illustrated in Fig. 1 adjusted for three different modes of operation.

In Fig. 1 a hermetically sealed container 10 has a base 11 and electric terminal pins 12, 13, 14 and 15 extending therethrough. The container 10 and the base 11 with the terminal pins may conveniently be constructed in similar fashion to like parts of metal walled electron discharge devices. A piezoelectric vibrator device 16, together with supporting means and means for maintaining the device 16 at a constant temperature, are enclosed within the container 10. The piezoelectric vibrator device 16 may be of any form, of which several are described in my above mentioned previous application.

The supporting means for the device 16 comprises a copper supporting member 17, to the upper end of which the device 16 is fastened in good heat conducting relation. The lower end of the copper supporting member 17 is clamped between a pair of electric insulating disks 18 and 19 which are fastened upon the portion of the terminal pin 12 extending within the container 10.

Opposite electrodes of the piezoelectric device 16 are connected through conductors 20 and 21 respectively to the electric terminal pins 12 and 15. Operating connections for exciting the piezoelectric vibrator device 16 into vibration may be made between the terminal pins 12 and 15.

The above mentioned means for maintaining the piezoelectric device 16 at a constant temperature includes a thermostat 24, 26 and an electric heating coil 23, both mounted on the copper supporting member 17, the thermostat 24, 26 being between the heater 23 and the device 16. The thermostat 24, 26 includes a bimetallic strip 24, carrying a movable contact 25, and cooperating with a fixed contact 26 mounted on a ceramic insulating block 27, which is attached to the copper supporting member 17. The heater 23 and adjacent portion of the member 17 must have sufficient thermal inertia to remain at a substantially constant temperature during the short periods when the thermostat 24, 26 opens and closes cyclically. These parts are made massive enough to accomplish this end. Their mass may be minimized by speeding up the cyclic opening and closing of thermostat 24, 26.

In Fig. 2 the thermostat 24, 26 is shown in greater detail and it may be seen that the fixed contact 26 is on the end of a screw member 28 which is threaded through the ceramic block 27 for adjustment of the closing temperature of the thermostat. A lock nut 29 is provided which locks the screw member 28 into the ceramic block 27.

The end of the bimetallic strip 24 opposite the movable contact 25 is fixedly attached to a screw member 30 which is threaded through a hole in the supporting member 17. This hole is at such a point that the bimetallic strip 24 may be turned about the screw member 30 to adjust the spacing between the strip 24 and member 17. A lock nut 31 is provided on the screw member 30 to lock the screw member 30 and the bimetallic strip 24 in any desired position.

An operating circuit for the thermostat 24, 26 and the heater 23 is provided from the electric terminal pin 14 through a conductor 32, lock nut 29, screw member 28, contacts 26 and 25, bimetallic strip 24, screw member 30, supporting member 17, coil 23, a conductor 33, and electric terminal pin 13.

Adjustment of the screw member 28 is effective to adjust the temperature at which the bimetallic strip 24 opens the contacts 25 and 26. This opening temperature is set at a desired point above the highest ambient temperatures to be encountered, and a suitable source of operating potential is connected between the electric terminal pins 13 and 14.

In the construction of this device great care is taken to exclude all material subject to decomposition by heat or the like, such as organic material, from the interior of the container 10. For example, the insulation for the thermostat 24, 26 is provided by the ceramic block 27. Alternatively, the screw 28 can be mounted on a metal plate insulated from the part 17 by ceramic bushings or the like. Further, the insulation for the heating coil 23 is provided by spun glass, suitably applied to the coil. The use of paints or sealing compounds containing materials which might be decomposed by heat, age, or the like, is entirely avoided. Such precautions have been found to make the operation of the thermostat 22 more reliable by reducing sparking and burning of the contacts 25 and 26.

It has also been found that the action of the thermostat 24, 26 is highly satisfactory if an atmosphere of clean, dry air be provided inside the container 10. It should be noted that no snap action is provided for the thermostat 24, 26, and that it makes and breaks its circuit slowly as the temperature varies. This is desirable in order that the thermostat 22 shall be most sensitive to temperature changes, and it is possible to use such slow make and break if the above prescribed precautions be taken.

The bimetallic strip 24 in the thermostat 24, 26 is so arranged that, upon a rise in temperature, the contacts 25 and 26 are separated to de-energize the heater coil 23. Conversely, upon a fall in temperature, the bimetallic strip 24 acts to close the contacts 25 and 26 and to energize the coil 23. Due to the absence of snap action in the thermostat 24, 26, the temperature of the bimetallic strip 24 is maintained highly constant at any chosen temperature, determined by the adjustment of the screw member 28.

The merit of a system for maintaining constant temperature during changes of ambient temperatures may be expressed as the ratio between ambient temperature change and temperature change of the controlled device. This ratio may be termed "control factor," and the higher the value of this control factor, the more efficient is the heating system in maintaining the controlled device at a constant temperature.

The control factor of the apparatus illustrated in Fig. 1 may be adjusted by adjustment of the spacing of the bimetallic strip 24 from the copper supporting member 17. This adjustment may be brought about by loosening the lock nut 31 and turning the bimetallic strip 24 so as to thread the screw member 30 in or out of the supporting member 17.

In general, it has been found that the spacing between the bimetallic strip 24 and the supporting member 17 should be increased by screwing the screw member 30 out of the strip 17, if the control factor is positive. That is, if the temperature of the piezoelecrtic vibrator device 16 decreases upon decreases in ambient temperature, the spacing between the bimetallic strip 24 and the supporting member 17 should be increased. It has also been found that if the control factor is negative, the spacing between the bimetallic strip 24 and supporting member 17 should be decreased. That is, if the temperature of the device 16 increases upon a decrease in ambient temperature, the bimetallic strip 24 should be moved nearer to the supporting member 17. Of course, after any such adjustment of the spacing between the bimetallic strip 24 and the supporting member 17, the screw member 28 should be readjusted so that the contacts 25 and 26 open at a desired temperature higher than any ambient temperatures to be encountered.

In certain cases it may be desired that the apparatus shall have a particular position or negative control factor, in order to utilize the resulting characteristic of the device 16, for example, to compensate for an opposite characteristic of associated apparatus.

Two particular examples of adjustment of apparatus like that illustrated in Fig. 1, which may be taken by way of illustration, serve to show how the adjustment should be made. In one particular device similar to that illustrated in Fig. 1 where the spacing between the bimetallic strip 24 and the copper supporting member 17 was .062 inch, the control ratio was found to be plus 150. That is, with such spacing the temperature of the piezoelectric device 16 decreased one tenth degree while the ambient temperature decreased 15 degrees. If a higher control factor than this be desired, the spacing between the bimetallic strip 24 and the copper supporting member 17 must be increased, and a trial value, for example, might be .064 inch.

In another case the spacing between the bimetallic strip 24 and the copper supporting member 17 was .074 inch, and the control factor was found to be —20. That is, with such spacing the temperature of the device 16 rose one degree while the ambient temperature dropped 20 degrees. To obtain a higher control factor, the spacing between the bimetallic strip 24 and the copper supporting member 17 should be decreased to some value less than .074 inch.

Figure 3:
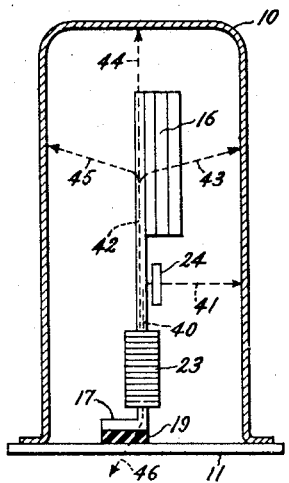
Figure 4:
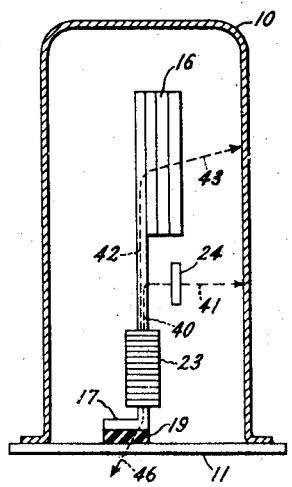
Figure 5:
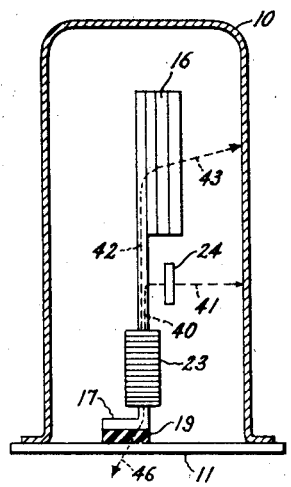

The theory underlying the adjustment of the spacing between the bimetallic strip 24 and the supporting member 17 for adjusting the control factor may be explained and analyzed by reference to Figs. 3, 4 and 5. These figures are three skeleton diagrams of the apparatus illustrated in Fig. 1, and the same numerals have been applied to similar portions thereof. A simplifying assumption has been made in the following analysis, namely, that the temperature of the bimetallic element 24 remains absolutely constant. This assumption is justified because the thermostat 22 has no snap action, and the small difference between the temperatures at which the thermostat opens and shuts can be neglected, in view of the mass and consequent thermal inertia of the device 16. Furthermore, the operating current for the heater 23 flows through the bimetallic strip 24, thereby causing the thermostat to open at a slightly lower temperature than it would otherwise. By suitable proportioning of the operating current for the coil 23 and the electrical resistance of the bimetallic strip 24, the amount of heating of the strip 24 by the electric current may be made just enough to cause the contacts 25 and 26 to open and close at exactly the same temperature.

It has also been assumed that the temperature of the heater 23 does not vary except when ambient temperatures change. This assumption is justified because the heater 23 and the adjacent portions of the supporting member 17 are provided with enough mass to cause their thermal inertia to be high enough so that the heater temperature is substantially constant as the thermostat opens and closes.

With this assumption the following analysis indicates why the device 16 can be maintained at an exactly constant temperature, so long as the thermostat 24 stays at a constant temperature and certain structural arrangements are provided. The following symbols have been selected for use in this analysis to express various relations in the apparatus of Fig. 3.

$H_T$ is the rate of heat flow from the heater coil 23 through the bimetallic strip 24 to regions of ambient temperature.
$H_C$ is the rate of heat flow from the heater coil 23 through the piezoelectric vibrator device 16 to regions of ambient temperature.
$R_{HT}$ is the resistance to the flow of heat encountered by heat passing from the heater coil 23 to the bimetallic strip 24.
$R_{TA}$ is the resistance to the flow of heat encountered by heat passing from the bimetallic strip 24 to regions of ambient temperature.
$R_{HC}$ is the resistance to the flow of heat encountered by heat passing from the heater coil 23 to the piezoelectric vibrator device 16.
$R_{CA}$ is the resistance to the flow of heat encountered by heat passing from the device 16 to regions of ambient temperature.
$T_H$ is the temperature of the heater coil 23.
$T_T$ is the temperature of the bimetallic strip 24.
$T_C$ is the temperature of the piezoelectric vibrator device 16.
$T_A$ is the prevailing ambient temperature of the region to which heat flows from the bimetallic strip 24 and the device 16, and may conveniently be regarded as the temperature of container 10.

The definition of these quantities should include the fact that the heat flow with which the quantity $H_T$ is associated may be through any path whatever between the heater coil 23 and the bimetallic strip 24 and thence by any path to regions of ambient temperature. The principal path from the heater coil 23 to the bimetallic strip 24 is by conduction through the copper supporting member 17 and by combined conduction through the screw member 30 and radiation between the supporting member 17 and the bimetallic strip 24. The principal paths between the bimetallic strip 24 and regions of ambient temperature are by radiation from the bimetallic strip 24 to the container 10, and by conduction to some extent through the screw member 28 and conductor 32. Similarly, the principal path of heat flow from the heater coil 23 to the device 16 is through the copper supporting member 17, while the principal paths of heat flow from the device 16 to regions of ambient temperature are by radiation from the device 16 to the container 10, as well as by conduction through the conductors 20 and 21.

These paths for heat flow are illustrated by way of example in the skeleton diagram of Fig. 3 by dotted lines as follows: The dotted line 40 exemplifies the path of heat flow from the heater coil 23 to the bimetallic strip 24; the dotted line 41 exemplifies the path of heat flow from the bimetallic strip 24 to the container 10; the dotted line 42 exemplifies the path of heat flow from the heater coil 23 to the device 16, and the dotted line 43 exemplifies the path of heat flow from the device 16 to the container 10. It should be understood, of course, that heat flows from the device 16 not only in the direction of the dotted line 43, but in many other directions, as illustrated by the dotted lines 44 and 45. The quantities previously defined for use in the analysis of the action of the apparatus of Fig. 1 are intended to represent an integrated picture of the total heat flow between the various elements mentioned.

Setting forth the previously defined quantities to express the various relations between heat flow, heat resistance, and temperature difference, the following equations result:

$$T_H - T_T = K H_T R_{HT} \quad (1)$$
$$T_T - T_A = K H_T R_{TA} \quad (2)$$
$$T_H - T_C = K H_C R_{HC} \quad (3)$$
$$T_C - T_A = K H_C R_{CA} \quad (4)$$

Dividing Equation 1 by Equation 3:

$$\frac{H_T R_{HT}}{H_C R_{HC}} = \frac{T_H - T_T}{T_H - T_C} \quad (5)$$

Similarly dividing Equation 2 by Equation 4:

$$\frac{H_T R_{TA}}{H_C R_{CA}} = \frac{T_T - T_A}{T_C - T_A} \quad (6)$$

It can be determined that $T_C$ can be maintained at a constant temperature in a heat system such as illustrated in the apparatus of Fig. 1 only when $T_C = T_T$. Under such conditions the right-hand portions of Equations 5 and 6 both reduce to unity, and the left-hand portions may be equated as follows:

$$\frac{H_T}{H_C} \times \frac{R_{HT}}{R_{HC}} = \frac{H_T}{H_C} \times \frac{R_{TA}}{R_{CA}} \quad (7)$$

Rearranging this equation:

$$\frac{R_{HT}}{R_{TA}} = \frac{R_{HC}}{R_{CA}} \quad (8)$$

Equation 8 sets forth the conditions which must be fulfilled in order that the temperature of the bimetallic strip 24 and the temperature of the device 16 shall always remain equal during changes of the temperature of the heater coil 23 and changes of the ambient temperatures represented by the temperature of the container 10. Since the Equation 8 contains only quantities representative of resistance to heat flow, which quantities are fixed in a mechanically stable structure, the conditions represented by Equation 8 can be satisfied in practice. Satisfaction of these conditions is obtained when the resistance to heat flow from the coil 23 to the bimetallic strip 24 bears the same ratio to the resistance to heat flow from the bimetallic strip 24 to the container 10 as the resistance to heat flow from the coil 23 to the device 16 bears to the resistance to heat flow from the device 16 to the container 10.

Analysis of the physical requirements for satisfaction of the conditions of Equation 8 shows that these requirements are attainable in many ways, of which one convenient way has been described previously as the adjustment of the spacing between the bimetallic strip 24 and the copper supporting member 17. When the bimetallic strip 24 is moved away from the supporting member 17, the resistance $R_{HT}$ to heat flow between the coil 23 and the bimetallic strip 24 is increased, while the resistance $R_{TA}$ to heat flow from the bimetallic strip 24 to the container 10 is decreased. Inverse changes in these two resistances are effected when the bimetallic strip 24 is moved toward the supporting member 17. Obviously, any other mechanically convenient means may be utilized to vary one or more of the four resistances to heat flow set forth in Equation 8. For example, the resistance to heat flow represented by the symbol $R_{CA}$ may be adjusted to some extent by changing the size, or by changing the conductivity, of one or both of the conductors 20 and 21. Such adjustment is effective in the same way as moving the bimetallic strip 24 toward or away from the member 17.

The heat circuits formed by the flow of heat from the coil 23 to the regions of ambient temperature, which may be regarded as the container 10, are actually in the form of a bridge circuit. The four corners of this bridge circuit are respectively the coil 23, which produces a point source of heat in the strip near the heater, the bimetallic strip 24, the device 16, and the container 10. The four arms of this bridge circuit, lying between these four corners, are the four resistances represented by the four quantities in Equation 8. Viewed in this manner the relations expressed in Equation 8 are simply that this bridge circuit shall be maintained in balance in order that the heat potential, that is, the temperature, of the bimetallic strip 24 and the device 16 shall always be equal. Equation 8 sets forth the conditions for maintaining this balance.

The manner in which the heat bridge circuit is altered by movement of the bimetallic strip 24 toward and away from the supporting member 17 may be seen more clearly by reference to Figs. 4 and 5. In Fig. 4 the bimetallic strip 24 is shown much farther from the supporting member 17 than in Fig. 3. In this arrangement the supporting member 17, the heating coil 23, and the device 16 are unchanged in position, so that the heat paths 42 and 43 remain unchanged. Consequently the quantities $R_{HC}$ and $R_{CA}$ in Equation 8 are not affected. However, the heat path 40 between the heating coil 23 and the bimetallic strip 24 has been lengthened, while the heat path 41 between the bimetallic strip 24 and the container 10 has been shortened. Consequently the quantity $R_{HT}$ in Equation 8 has been increased, and the quantity $R_{TA}$ has been decreased.

The position of the bimetallic strip 24 with respect to the supporting member 17 necessary to provide balance in the heat bridge circuit depends on the resistance to heat flow in the heat paths 42 and 43. If it be found that the arrangement of the parts in Fig. 4 is associated with a negative control factor, which means that the bimetallic strip 24 is too far from the supporting member 17, the strip 24 may be moved back toward the supporting member 17, as illustrated in Fig. 5.

When the bimetallic strip 24 is thus moved back toward the supporting member 17 the heat paths 42 and 43, extending between the heating coil 23, device 16, and the container 10, are unchanged, while the heat paths 40 and 41 are respectively decreased and increased. It has been found very convenient to adjust the resistance of the various heat paths in this fashion, by adjustment of the position of the bimetallic strip 24 with respect to the supporting member 17.

It may be found in certain cases in which the exact mechanical structure illustrated in Fig. 1 is not utilized that motion of the bimetallic strip 24 in the available free space is not sufficient to balance the heat bridge circuit, or it may be found that adjustment of the bimetallic strip 24 to produce the desired control factor leaves the strip 24 very near the supporting member 17. In such cases it may be desirable to increase the resistance $R_{HC}$ which is presented to the flow of heat through the heat path 42. This may be readily accomplished by cutting partially through the copper supporting member 17 between the thermostat 22 and the piezoelectric vibrator device 16. After such an increase in the heat resistance between the heating coil 23 and the device 16, the position of the bimetallic strip 24 for balance of the heat bridge circuit is farther away from the member 17.

The foregoing analysis of heat relations in the apparatus of Fig. 1 indicates that heat which flows directly from the heating coil 23 to regions of ambient temperature without affecting either the bimetallic strip 24 or the device 16 produces no effect on the heat bridge circuit previously described. Such heat flows, for example, downward through the supporting member 17 and through the electric insulator 19 to the base 11 of the container 10, as exemplified by the dotted arrow 46. Since such heat flow has no effect on the heat bridge circuit, it is desirable that it be minimized, as by making the electric insulator 19 a reasonably good heat insulator. It is also for the same reason desirable to minimize heat flow from the heating coil 23 to the container 10 by radiation.

It is obvious that a heat bridge circuit, as described above, may be formed by other mechanical configurations than that illustrated in the apparatus of Fig. 1. The bridge circuit performs satisfactorily so long as its four corners are formed respectively by a substantially point heat source, temperature responsive means for controlling the temperature of the heat source, a device whose temperature is to be controlled, and a region to which the heat from the source may flow; and so long as the resistances of the four arms between such four corners are related as in Equation 8. The member 17, in effect, pipes the heat from the point source to the region of the temperature responsive device and to the crystal, these two devices being spaced sufficiently apart that high heat resistance exists between them when considered with respect to the resistance of any of the four arms of the bridge. This means that the two paths from the point heat source to the region of common temperature are distinct, and entirely analogous to those of an electrical bridge, and the balance may be effected in the same way. It is desirable that there be a sufficient amount of thermal inertia associated with that corner of the bridge from which heat flows through the bridge circuit so that irregular production of heat by the heat source, caused, for example, by opening and closing of the thermostat, shall produce minimum change in the temperature of the heat source. It is, however, desirable that this thermal inertia associated with the heat source shall not be so great that the apparatus takes a long time to heat up to operating temperature from a cold condition.

My invention is not limited in scope to the maintenance of piezoelectric vibrator devices at a constant temperature, but may be utilized to maintain any desired object at a constant temperature, or to provide that the temperature of the object shall vary as desired when the ambient temperatures vary.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, an object whose temperature is to be controlled, a container for said object arranged to be affected by ambient temperatures, an elongated heat conducting member for supporting said object from a wall of said container, a concentrated source of heat on said member between said object and the point to which it is attached to said wall, temperature responsive means between said source and said object attached to said member for controlling the temperature of said source of heat, said member being effective efficiently to transmit heat from said source respectively to said object and said temperature responsive means from which such heat is radiated to said container, said temperature responsive means being so spaced from said member that the resistance to heat flow from said source to said temperature responsive means is equal to the product of the resistances to heat flow from said source to said object and from said temperature responsive means to said region divided by the resistance to heat flow from said object to said region, and said temperature responsive means and said object being spaced to have high resistance to heat flow therebetween, whereby said object is maintained at the temperature of said temperature responsive means during temperature variations of said region.

2. In combination, a device which is undesirably affected upon changes in temperature, a container surrounding said device, heat transmitting means for supporting said device from a wall of said container, means for heating said heat transmitting means at a point removed from said device, whereby heat flows through said supporting means to said device and is transmitted therefrom to said container primarily by radiation, means for controlling the temperature of said heating means in response to the temperature at a point spaced from said heat transmitting supporting means between said heating means and said device, heat being transmitted past said temperature controlling means to said container primarily by radiation, the ratio of the resistance to the flow of heat from said heating means to said temperature controlling means to the resistance to the flow of heat from said temperature controlling means to said container being substantially equal to the ratio of the resistance to the flow of heat from said heating means to said device to the resistance to the flow of heat from said device to said container.

3. In combination, a device which is undesirably affected upon changes in temperature, a container surrounding said device, a flat metal strip having high thermal conductivity fastened to one wall inside of said container and carrying said device on its free end, means for electrically heating said strip between said wall and said device, and temperature responsive means for controlling the energization of said heating means supported on said strip between said heating means and said device and comprising a substantially flat bimetallic strip spaced a distance from said supporting strip, said distance being adjusted to make the ratio of the resistance to the flow of heat from said heating means to said bimetallic strip to the resistance to the flow of heat from said bimetallic strip to said container equal to the ratio of the resistance to the flow of heat from said heating means to said device to the resistance to the flow of heat from said device to said container.

4. In combination, a device which is undesirably affected upon changes in temperature, a container surrounding said device, a flat metal strip having high thermal conductivity fastened to one wall inside of said container and carrying said device on its free end, means for electrically heating said strip between said wall and said device, temperature responsive means for controlling the energization of said heating means supported on said strip between said heating means and said device and comprising a substantially flat bimetallic strip spaced a distance from said supporting strip, and means for maintaining said bimetallic strip at such a distance from said supporting strip that the ratio of the resistance to the flow of heat from said heating means to said bimetallic strip to the resistance to the flow of heat from said bimetallic strip to said container is equal to the ratio of the resistance to the flow of heat from said heating means to said device to the resistance to the flow of heat from said device to said container.

5. The combination, in a device for regulating the temperature of a piezoelectric crystal, of a heat chamber having an elongated heat conductor mounted therein, a heater thereon to produce substantially a point source of heat therein, a temperature responsive device and a piezoelectric crystal positioned between said elongated heat conductor and the side walls of said chamber at points such that high resistance to heat flow exists therebetween and separate distinct heat paths extend from said heat conductor to said side walls respectively through said temperature responsive device and crystal, said heat conductor conveying heat from said point source to said paths, and said temperature responsive device and crystal being positioned in said paths at points of equal temperature.

6. The combination, in a temperature regulating device for piezoelectric crystals, of a heat chamber, an elongated body positioned in said chamber spaced from the side walls thereof and having high thermal conductivity throughout its length, a heater for said body, a temperature responsive device to control said heater, means to support the piezoelectric crystal to be regulated and said temperature responsive device at respective points along said body and between said body and said side walls at positions such that the heat paths from said body to said side walls through said temperature responsive device and crystal respectively form a balanced heat bridge having said temperature responsive device and crystal at diagonally opposite points of equal temperature.

7. The combination, in a temperature regulating device for piezoelectric crystals, of a heat chamber, an elongated body of high thermal conductivity supported from a wall of said chamber and extending within said chamber, a heater for said body mounted thereon to produce substantially a point source of heat therein, temperature responsive means mounted on said body for controlling said heater, said temperature responsive means being positioned in a heat path between said elongated body and a side wall of said chamber, means to support the piezoelectric crystal to be regulated in a second heat path between said elongated body and a side wall of said chamber sufficiently distant from said temperature responsive means that high resistance to heat flow exists therebetween, said elongated body efficiently conveying heat from said source to the region of said temperature responsive device and crystal, said crystal and said temperature responsive means being so positioned that said paths form a thermally balanced heat bridge having said crystal and temperature responsive means at diagonally opposite points of equal temperature.

8. The combination, in a heat chamber, of an elongated heat conductor in said chamber thermally isolated from the side walls thereof and having cross sectional dimensions small relative to its length and relative to the cross sectional dimension of said chamber, a concentrated heater positioned on said conductor to produce substantially a point source of heat therein whereby said heat travels outward along said conductor and is radiated to the side walls of said chamber, temperature responsive means and a body to be regulated positioned in separate respective heat paths between said conductor and said side walls and sufficiently spaced from each other to have high resistance to flow of heat therebetween, said temperature responsive means and body being positioned at points of equal temperature in said paths.

CHARLES F. BALDWIN.